United States Patent
Fey et al.

(10) Patent No.: US 9,671,311 B2
(45) Date of Patent: Jun. 6, 2017

(54) METHOD AND DEVICE FOR DETERMINING A LAMBDA AIR RATIO USING A GAS SENSOR

(71) Applicant: Robert Bosch GmbH, Stuttgart (DE)

(72) Inventors: Michael Fey, Wiernsheim (DE); Juergen Schwarz, Schwieberdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 466 days.

(21) Appl. No.: 13/932,647

(22) Filed: Jul. 1, 2013

(65) Prior Publication Data

US 2014/0007651 A1  Jan. 9, 2014

(30) Foreign Application Priority Data

Jul. 5, 2012 (DE) .......................... 10 2012 211 685

(51) Int. Cl.
*G01M 15/10* (2006.01)
(52) U.S. Cl.
CPC ................................. *G01M 15/104* (2013.01)
(58) Field of Classification Search
CPC .. G01N 27/407; G01N 27/4175; Y02T 10/47; F01N 11/00; F01N 9/005
USPC ....................................................... 73/23.32
See application file for complete search history.

(56) References Cited

U.S. PATENT DOCUMENTS

| 3,938,075 | A | * | 2/1976 | Reddy | ................. | F02D 41/1495 123/688 |
| 3,938,479 | A | * | 2/1976 | Oberstadt | ........... | F02D 41/1496 123/491 |
| 4,463,594 | A | * | 8/1984 | Raff | .................... | F02D 41/1481 123/694 |
| 4,824,548 | A | * | 4/1989 | Iino | .................... | G01N 27/4071 204/406 |
| 4,943,330 | A | * | 7/1990 | Iino | .................... | G01N 27/4071 156/89.16 |
| 5,111,792 | A | * | 5/1992 | Nagai | ................ | G01N 27/4067 123/685 |

(Continued)

FOREIGN PATENT DOCUMENTS

DE  102008005110  7/2009
WO  WO2009/156007  12/2009

*Primary Examiner* — Freddie Kirkland, III
(74) *Attorney, Agent, or Firm* — Gerard Messina

(57) ABSTRACT

A method for determining a lambda air ratio using a gas sensor having a ceramic measuring element, an output voltage of the gas sensor changing abruptly if lambda is changed in the range around lambda=1 and the gas sensor having an initial inverse voltage which is dependent on the temperature of the gas sensor. A threshold value for the initial inverse voltage is established for a limit between a lambda value below and above 1 as a function of the temperature of the gas sensor. Also described is a device for implementing the method. The method and the device make it possible to operate gas sensors having a ceramic measuring element at an even lower temperature than according to the related art and thus reduce the period between the start of an internal combustion engine and the operational readiness of a lambda regulation. This makes it possible to reduce the fuel consumption as well as the emission of undesirable components of the exhaust gas.

18 Claims, 1 Drawing Sheet

(56) References Cited

U.S. PATENT DOCUMENTS

| | | | | |
|---|---|---|---|---|
| 5,263,358 A * | 11/1993 | Center | ................ | F02D 41/1479 |
| | | | | 73/23.32 |
| 5,747,668 A * | 5/1998 | Cianciara | ........... | G01N 27/4175 |
| | | | | 73/1.06 |
| 6,714,876 B2 * | 3/2004 | Kimoto | ................ | G01N 27/122 |
| | | | | 204/401 |
| 6,932,069 B2 * | 8/2005 | Suyama | ................ | F01N 3/0871 |
| | | | | 123/285 |
| 8,961,761 B2 * | 2/2015 | Maeda | .................. | F01N 11/007 |
| | | | | 204/406 |
| 2009/0107839 A1 * | 4/2009 | Scheffel | ............... | G01N 27/419 |
| | | | | 204/406 |
| 2010/0083743 A1 * | 4/2010 | Wehmeier | ........... | F02D 41/1495 |
| | | | | 73/114.72 |

* cited by examiner

METHOD AND DEVICE FOR DETERMINING A LAMBDA AIR RATIO USING A GAS SENSOR

FIELD OF THE INVENTION

The present invention relates to a method for determining a lambda air ratio using a gas sensor having a ceramic measuring element, an output voltage of the gas sensor changing abruptly if lambda is changed in the range around lambda=1, and the gas sensor having an initial inverse voltage which is dependent on the temperature of the gas sensor.

The present invention further relates to a device for determining a lambda air ratio using a gas sensor having a ceramic measuring element, having a control unit for evaluating an output voltage of the gas sensor, the output voltage of the gas sensor having a characteristic curve which changes abruptly in the range around lambda=1 and the gas sensor having an initial inverse voltage which is dependent on the temperature of the gas sensor.

BACKGROUND INFORMATION

Legal regulations prescribe the monitoring of the composition of the exhaust gas of internal combustion engines for compliance with limiting values. For that purpose, undesirable substances in the exhaust gas such as nitrogen oxides and carbon monoxide are converted into substances considered to be non-critical such as water vapor, carbon dioxide and nitrogen with the aid of regulated three-way catalytic converters. This conversion requires that the air-fuel mixture supplied to the internal combustion engine is within a certain range of composition around a stoichiometric composition. This composition is referred to as the parameter lambda=1. The composition of the air-fuel mixture is monitored using exhaust gas sensors provided in the exhaust gas tract of the internal combustion engine, for example, in the form of broadband lambda sensors, which determine the oxygen partial pressure. Broadband lambda sensors are made up of among other things, a Nernst cell, which determines the concentration of oxygen, a pump cell which adjusts the oxygen concentration, a cavity by which the two cells are connected, and a diffusion barrier through which the exhaust gas is able to diffuse from the exhaust gas tract into the cavity. In an alternative embodiment, the oxygen concentration is determined using a discrete-level sensor, also referred to as a two-point lambda sensor, the signal of which indicates an abrupt change in the output signal in a narrow range around lambda=1.

In both cases, the lambda sensor is based on a solid electrolyte, which is conductive for oxygen ions at a temperature above 350° C., which is referred to as the activation temperature. The working temperature of the exhaust gas sensor, also referred to as the nominal temperature, is typically between 650° C. and 850° C. The temperature at which the lambda sensor is operationally ready and meets the requirements in an engine control system lies between the activation temperature and the nominal temperature of the sensor. Above this temperature, the lambda regulation may be activated and contribute to reducing the emission of undesirable components in the exhaust gas of the internal combustion engine. For the purpose of reducing the exhaust gas emissions, the lambda sensor must therefore, on the one hand, reach a suitable temperature as quickly as possible, and on the other hand, detect operational readiness as quickly as possible. This finding is based on a measurement of the temperature of the lambda sensor.

Discrete-level sensors may be designed in such a way that a voltage on a solid electrolyte is picked up, one side being exposed to an exhaust gas of an internal combustion engine and the other side being exposed to the outside air as the reference gas. Such a system is known from WO2009/156007, in which a pumped oxygen reference is used as the reference gas. WO2009/156007 describes a lambda sensor for measuring the exhaust gas lambda in an exhaust area of an internal combustion engine, which contains a first electrode 20 situated in a measuring gas cavity 18 connected to the exhaust gas, the lambda sensor containing a second electrode 24, which is connected to the first electrode 20 via a solid electrolyte 22 conducting oxygen ions and which is situated in a reference gas channel 26, characterized in that a specifically formed oxygen storage 40, 50, 62, 70 is provided in reference gas channel 28. Such a discrete-level sensor is sold by the manufacturer Bosch under the name "LSF Xfour."

The influence of the temperature of the lambda sensor on its output signal and on its accuracy in determining the composition of the air-fuel mixture is known. From DE 102008005110A1 a method is known for operating at least one lambda sensor in an exhaust gas system of an internal combustion engine having a lambda regulating system for regulating an air/fuel mixture ratio of a combustion process of an internal combustion engine, the exhaust gas system having at least one heating element for heating up the lambda sensor, which is heated in one method step, and the heating element being heated in a regulated way by a heating element control, characterized in that in a first group of steps at least two of the following parameters of the lambda sensor are used and/or detected;

applying a defined or undefined heating power;

detecting the ohmic resistance of the heating element of the lambda sensor;

detecting the ohmic resistance of the signal electrodes of the lambda sensor;

detecting the electrical sensor signal of the lambda sensor;

in a second group of steps, from at least one detected parameter value, a change of the detected parameter is ascertained or detected, in a third group of steps a comparison is made in each case of the ascertained change of the detected parameter with a predefined reference value for the expected correlating change of the other used and/or detected parameter(s), and the process is advanced to a fourth group of steps using the result of the comparison, and in a fourth group of steps, a correction value is determined, at least one operational reference value being obtained from a reference value supply device and being supplemented to form an operational setpoint value of the lambda sensor using the determined correction value.

The aim of the method and the associated control is the correction of the output signal of the lambda sensor with respect to the influences of manufacturing-related variations or aging and, among other things, the temperature characteristic of the internal resistance of the lambda sensor. The publication does not deal with an extension of the measuring range of the lambda sensor to lower operating temperatures.

SUMMARY

An object of the present invention is to provide a method for achieving the operational readiness of an exhaust gas sensor more quickly.

A further object of the present invention is to provide a device for implementing the method.

An object of the present invention relating to the method is achieved in that a threshold value for the initial inverse voltage is established for a limit between a lambda value below and above 1 as a function of the temperature of the gas sensor. The output voltage of ceramic measuring elements of discrete-level sensors is dependent on the temperature of the ceramic when lambda is predefined. The voltage for a lambda value=1 is also dependent on the temperature. Only in a range above 700° C. is the critical temperature approximately constant and lies, for example, at a value of 455 mV. This is one of the reasons for which such gas sensors are used at an operating temperature in the range above 700° C. A lambda regulation of an internal combustion engine is not effective until this operating temperature is reached. To minimize the internal combustion engine's emissions of undesirable substances, the operational readiness of the gas sensor is therefore be reached as quickly as possible. The gas sensors are, of course, heated electrically and by exhaust gases; nonetheless, a considerable length of time passes until the above-named operating temperature is reached, and it would be advantageous to be able to use the gas sensor already at a lower temperature. According to the present invention, this is achieved by the voltage for a rich and for a lean mixture being determined starting from a temperature of the ceramic measuring element of 300° C., and by a threshold value for the initial inverse voltage for the limit between a lambda value below and above 1 being established from these voltages as a function of the temperature.

According to one embodiment of the method, the lambda air ratio is determined in an exhaust gas tract of an internal combustion engine or in a measuring space of an exhaust gas sensor connected to the exhaust gas tract via a diffusion barrier. This makes it possible to apply the method to a discrete-level sensor in the exhaust gas tract or to a Nernst cell of a broadband lambda sensor.

A particularly robust and cost-effective embodiment provides that the temperature of the gas sensor is determined from an internal resistance of the ceramic measuring element of the gas sensor. In this embodiment, no additional temperature sensor is required and the temperature is determined directly on the ceramic component.

If the threshold value for the initial inverse voltage is established based on a prediction of a curve of the temperature of the gas sensor or a curve of the internal resistance of the ceramic measuring element, it is possible to reduce the number of temperature measurements and thus reduce a polarization of the gas sensor, which could influence the measuring result. Furthermore, the use of predicted values may reduce the influence of electrical interference.

If the prediction for the curve of the temperature of the gas sensor or of the curve of the internal resistance of the ceramic measuring element is checked and/or corrected by measuring the temperature or the internal resistance, it is possible to adjust the prediction to instantaneous circumstances of the inflow and outflow of heat at the location of the gas sensor. The prediction may be present in the form of a formula or in the form of single values of a table.

A particularly rapid operational readiness is achieved if the gas sensor is used at a temperature of the ceramic measuring element in the range between 300° C. and 600° C., preferably in the range below 500° C. In this temperature range, the probability of failure of the gas sensor is reduced, since the ceramic measuring element is in this case insensitive to water hammer from condensate in the exhaust gas.

The object of the present invention relating to the device is achieved in that the control unit contains a device for determining a threshold value for a limit of the output voltage of the gas sensor between a lambda value below and above 1 as a function of the temperature of the ceramic measuring element. Since the output voltage of a gas sensor having a solid electrolyte is dependent on the temperature when lambda is predefined, according to the present invention, the working range of the gas sensor may be expanded to low temperatures, in that a temperature-dependent threshold value for an output voltage of the gas sensor is determined using a calculation specification, a table of values or a circuit arrangement for this temperature range, which separates a range of lambda below 1 from a range of lambda above 1. The threshold value may be established in the control unit in a learning phase, and adjusted during operation by adaptation to instantaneous changes, for example, by aging of the gas sensor.

A particularly cost-effective system provides that the gas sensor is designed as a two-point lambda sensor.

If the exhaust gas sensor has a pumped oxygen reference, it is independent from atmospheric pollution in the outside air, and deposits on the gas sensor which could influence the measuring accuracy are avoided.

In one preferred application, a device or a method as recited in the description for determining an oxygen concentration in the exhaust gas tract of an internal combustion engine is used for ascertaining a composition of an air-fuel mixture supplied to the internal combustion engine. The present invention makes it possible to reduce the fuel consumption and the pollutant emission of the internal combustion engine.

DETAILED DESCRIPTION

Figure 1:
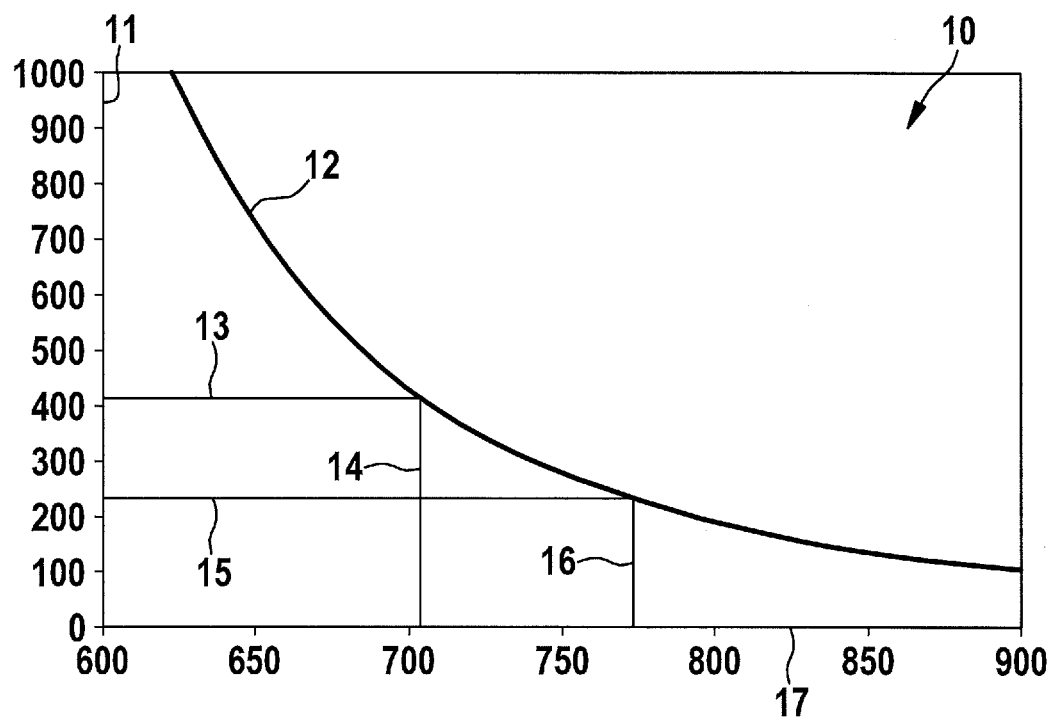
FIG. 1 shows a diagram of the relationship between temperature and internal resistance of a gas sensor.

FIG. 1 shows a resistance curve 12 of an internal resistance of a gas sensor having a ceramic measuring element based on a solid electrolyte in a resistance diagram 10 along a temperature axis 17 and a resistance axis 11.

A sharp reduction of the resistance value with increasing temperature is characteristic for resistance curve 12. In resistance diagram 10, a resistance setpoint value 15 is plotted, at which working point 16 of the gas sensor characterized by a temperature is reached. Furthermore, an operational readiness temperature 14 is plotted, which according to the related art must be reached before a lambda regulation is operationally ready. Assigned to this operational readiness temperature 14 is a maximum resistance value 13, from which a control determines the operational readiness of the lambda regulation.

Figure 2:
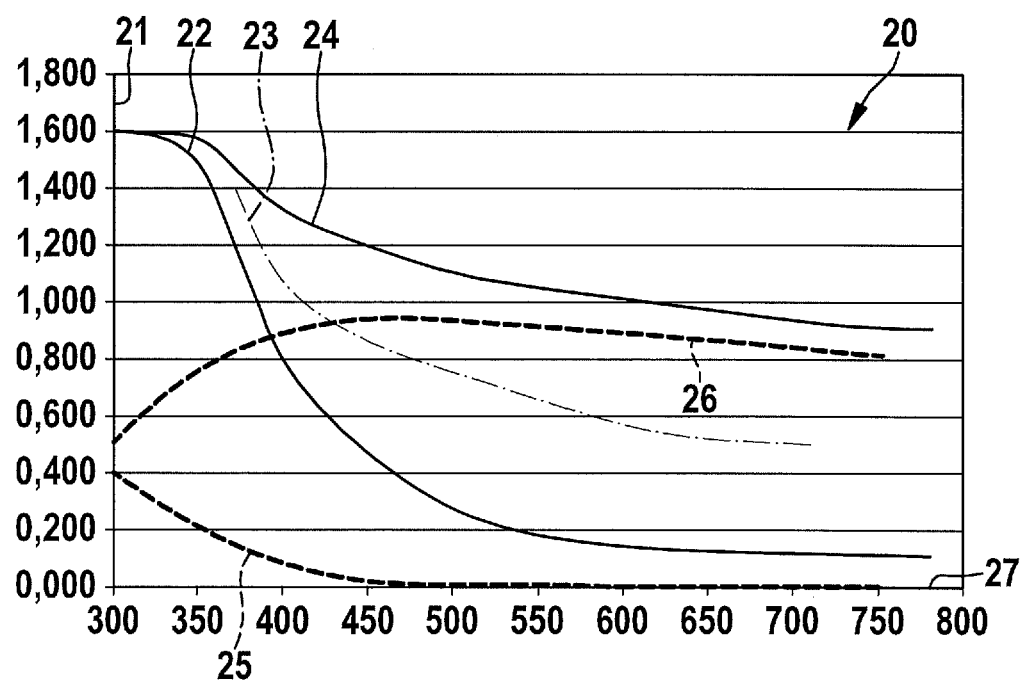
FIG. 2 shows a signal diagram of a gas sensor.

FIG. 2 shows a signal diagram 20 having a voltage axis 21 and a temperature axis 27, along which the output voltage of gas sensors is plotted. A first lower curve 22 represents the temperature dependence of the output voltage in a gas sensor in a predefined lean gas mixture. A first upper curve 24 represents the temperature dependence of the output voltage of the gas sensor in a predefined rich gas mixture. A temperature-dependent signal threshold 23 represents the output voltage at the threshold between the lean and rich range for the considered gas sensor. With the aid of this comparison voltage, it is possible to use the output signal of the gas sensor for the lambda regulation even at a temperature substantially below operational readiness temperature 14 from FIG. 1. This makes it possible to shorten the period between the start of the internal combustion engine and the beginning of the lambda regulation, and it is possible to reduce the emission of undesirable exhaust gas components.

A second lower curve 25 shows the temperature-dependent curve of the output voltage of a gas sensor of a different type when the latter is exposed to a predefined lean gas mixture. Associated with second lower curve 25, a second upper curve 26 shows the curve of the output voltage of the gas sensor when the latter is exposed to a predefined rich gas mixture. From these curves, it is also possible to derive a threshold voltage, so that this type of sensor may already be used at a lower temperature than the one presently used for a regulation.

What is claimed is:

1. A method for determining a lambda air ratio using a gas sensor, the method comprising:
   determining, by a control unit, a first characteristic voltage of the gas sensor for a first gas mixture having a lambda value that exceeds 1 by a first predetermined amount for a temperature range below an operational readiness temperature of the gas sensor;
   determining, by the control unit, a second characteristic voltage of the gas sensor for a second gas mixture having a lambda value that is less than 1 by a second predetermined amount for the temperature range below the operational readiness temperature of the gas sensor;
   determining by the control unit, an inverse voltage representing a limit between lambda values below 1 and lambda values above 1 for the temperature range below the operational readiness temperature of the gas sensor as a function of the first characteristic voltage and the second characteristic voltage; and
   using, by the control unit, the determined inverse voltage to operate the gas sensor to regulate a lambda ratio of exhaust gas in an exhaust gas tract of an internal combustion engine for the temperature range below the operational readiness temperature of the gas sensor.

2. The method as recited in claim 1, further comprising:
   determining the lambda ratio one of in an exhaust gas tract of an internal combustion engine and in a measuring space of an exhaust gas sensor connected to the exhaust gas tract via a diffusion barrier.

3. The method as recited in claim 1, further comprising:
   determining the temperature of the gas sensor from the internal resistance of the ceramic measuring element of the gas sensor.

4. The method as recited in claim 3, wherein the initial inverse voltage is established based on a prediction of one of a curve of the temperature of the gas sensor and a curve of the internal resistance of the ceramic measuring element.

5. The method as recited in claim 4, wherein the prediction for one of the curve of the temperature of the gas sensor and the curve of the internal resistance of the ceramic measuring element is at least one of checked and corrected by measuring one of the temperature and the internal resistance.

6. The method as recited in claim 1, wherein the gas sensor is used at a temperature of the ceramic measuring element in a range between 300° C. and 600° C.

7. The method as recited in claim 1, wherein the gas sensor is used at a temperature of the ceramic measuring element in a range below 500° C.

8. The method as recited in claim 1, wherein the first predetermined amount is the same as the second predetermined amount.

9. The method as recited in claim 1, wherein the first characteristic voltage is extrapolated into a first voltage curve, the second characteristic voltage is extrapolated into a second voltage curve, and the initial inverse voltage is established as curve between the first voltage curve and the second voltage curve.

10. The method as recited in claim 1, wherein the initial inverse voltage is established based on one of a formula or values of a table.

11. The method as recited in claim 1, wherein the first and second characteristic voltages are measured as a function of temperature, and the initial inverse voltage is calculated as a function of temperature as a midpoint between the first and second characteristic voltages.

12. The method as recited in claim 1, further comprising storing, by the control unit, at least one of the first and second characteristic voltages or the initial inverse voltage as a function of temperature.

13. A device for determining a lambda air ratio using a gas sensor, the device comprising:
   a control unit configured to:
      determine a first characteristic voltage of the gas sensor for a first gas mixture having a lambda value that exceeds 1 by a first predetermined amount for a temperature range below an operational readiness temperature of the gas sensor;
      determine a second characteristic voltage of the gas sensor for a second gas mixture having a lambda value that is less than 1 by a second predetermined amount for the temperature range below the operational readiness temperature of the gas sensor;
      determine an inverse voltage representing a limit between lambda values below 1 and lambda values above 1 for the temperature range below the operational readiness temperature of the gas sensor as a function of the first characteristic voltage and the second characteristic voltage; and
      use the determined inverse voltage to operate the gas sensor to regulate a lambda ratio of exhaust gas in an exhaust gas tract of an internal combustion engine for the temperature range below the operational readiness temperature of the gas sensor.

14. The device as recited in claim 13, wherein the gas sensor is designed as a two-point lambda sensor.

15. The device as recited in claim 13, wherein the gas sensor has a pumped oxygen reference.

16. The device as recited in claim 13, wherein the first and second characteristic voltages are measured as a function of temperature, and the initial inverse voltage is calculated as a function of temperature as a midpoint between the first and second characteristic voltages.

17. The device as recited in claim 13, further configured to store at least one of the first and second characteristic voltages or the initial inverse voltage as a function of temperature.

18. A method of using a device for determining a lambda air ratio using a gas sensor, the method comprising:
   determining, by a control unit, a first characteristic voltage of the gas sensor for a first gas mixture having a lambda value that exceeds 1 by a first predetermined amount for a temperature range below an operational readiness temperature of the gas sensor;
   determining, by the control unit, a second characteristic voltage of the gas sensor for a second gas mixture having a lambda value that is less than 1 by a second predetermined amount for the temperature range below the operational readiness temperature of the gas sensor;

determining by the control unit, an inverse voltage representing a limit between lambda values below 1 and lambda values above 1 for the temperature range below the operational readiness temperature of the gas sensor as a function of the first characteristic voltage and the second characteristic voltage; and ascertaining, using the gas sensor, a composition of an air-fuel mixture supplied to an internal combustion engine using an initial inverse voltage for the temperature range below the operational readiness temperature of the gas sensor.

\* \* \* \* \*